United States Patent
McKinstrie

(10) Patent No.: US 7,304,788 B2
(45) Date of Patent: Dec. 4, 2007

(54) TRANSLATION OF INDIVIDUAL AND ENTANGLED STATES OF LIGHT BY FOUR-WAVE MIXING IN FIBERS

(75) Inventor: Colin J. McKinstrie, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/314,280

(22) Filed: Dec. 21, 2005

(65) Prior Publication Data

US 2007/0139762 A1    Jun. 21, 2007

(51) Int. Cl.
*G02F 1/35* (2006.01)
(52) U.S. Cl. ............ 359/332; 359/326; 359/330; 385/123
(58) Field of Classification Search ........... None
See application file for complete search history.

(56) References Cited

U.S. PATENT DOCUMENTS

| | | | |
|---|---|---|---|
| 5,386,314 A * | 1/1995 | Jopson | 359/326 |
| 6,529,314 B1 * | 3/2003 | Shukunami et al. | 359/332 |
| 2002/0114553 A1 * | 8/2002 | Mead et al. | 385/10 |
| 2004/0042060 A1 | 3/2004 | McKinstrie et al. | |
| 2005/0146780 A1 | 7/2005 | McKinstrie et al. | |
| 2006/0051100 A1 * | 3/2006 | Watanabe | 398/152 |

OTHER PUBLICATIONS

U.S. Appl. No. 11/127,244, filed Jun. 30, 2005, McKinstrie.
U.S. Appl. No. 11/154,483, filed Jun. 16, 2005, McKinstrie.
C. J. McKinstrie, S. Radic and A. R. Chraplyvy, IEEE J. Sel. Top. Quantum Electron. 8, 538-547 and 956 (2002).

* cited by examiner

*Primary Examiner*—Sung Pak
*Assistant Examiner*—Chad H. Smith

(57) ABSTRACT

Optical frequency conversion by four-wave mixing in a fiber is considered. If the frequencies and polarizations of the waves are chosen judiciously, four-wave mixing enables the translation of individual and entangled states, without the noise pollution associated with parametric amplification (modulation instability or phase conjugation) and with reduced noise from stimulated Raman scattering.

20 Claims, 7 Drawing Sheets

TRANSLATION OF INDIVIDUAL AND ENTANGLED STATES OF LIGHT BY FOUR-WAVE MIXING IN FIBERS

FIELD OF THE INVENTION

The invention relates to the field of fiber-optic communication systems and, in particular, to a method and system for the translation of individual and entangled states of light by four-wave mixing in fibers.

BACKGROUND OF THE INVENTION

Optical communication systems employ optical amplifiers, e.g., to compensate for signal attenuation in optical fibers. One type of amplifier that may be used in a fiber-based optical communication system is an optical parametric amplifier (OPA). As known in the art, an OPA is a device that produces a tunable coherent optical output via nonlinear optical processes, in which, typically, one or two pump-wave photons are converted into two new photons with conservation of photon energy and momentum. The waves corresponding to the two new photons are usually referred to as a signal wave and an idler wave.

In many optical systems, the required photon frequencies differ from the frequencies at which the transmitters emit photons or the receivers detect them efficiently. For this reason, optical frequency conversion (FC) is important. Parametric amplification (PA) in a fiber is based on four-wave mixing (FWM). Not only does FWM produce amplified signals, it also produces idlers that are frequency-shifted and, in some cases, phase-conjugated images of the signals. Consequently, PAs have many uses in classical communication systems. However, with amplification comes noise. Although this noise might not impair the performance of classical (many-photon) systems, it does change the characteristics of quantal (few-photon) systems. Consequently, PAs must be used with caution in few-photon systems.

SUMMARY OF THE INVENTION

Various deficiencies of the prior art are addressed by the present invention of a method and device for frequency conversion in the art of fiber-optic communications.

One aspect of the invention is an optical parametric device having a first pump and a second pump capable of frequency conversion in a classical or quantal system, including the first and second pump communicating first and second pump waves to an optical fiber, wherein the first pump wave has a first frequency and the second pump wave has a second frequency different from the first frequency; and a transmitter for inputting a weak signal wave having a frequency that differs from the first and second pump frequencies, wherein the weak signal is frequency converted to an idler, whose frequency also differs from the first and second pump frequencies.

Another aspect of the invention is a method of operating an optical parametric device having a first pump and a second pump, as a frequency converter of a classical or quantal system, including applying first and second pump waves from the first and second pump to a fiber, wherein the first pump signal has a first frequency and the second pump signal has a second frequency different from the first frequency; and transmitting a weak signal wave having a frequency that differs from the first and second pump frequencies, wherein the weak signal is frequency converted to an idler, whose frequency also differs from the first and second pump frequencies.

BRIEF DESCRIPTION OF THE DRAWINGS

The teachings of the present invention can be readily understood by considering the following detailed description in conjunction with the accompanying drawings, in which.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention will be generally described within the context of an optical parametric amplifier (OPA). It will be appreciated by those skilled in the art that the invention may be utilized within the context any fiber-optic communication systems and/or portions thereof.

Figure 1:
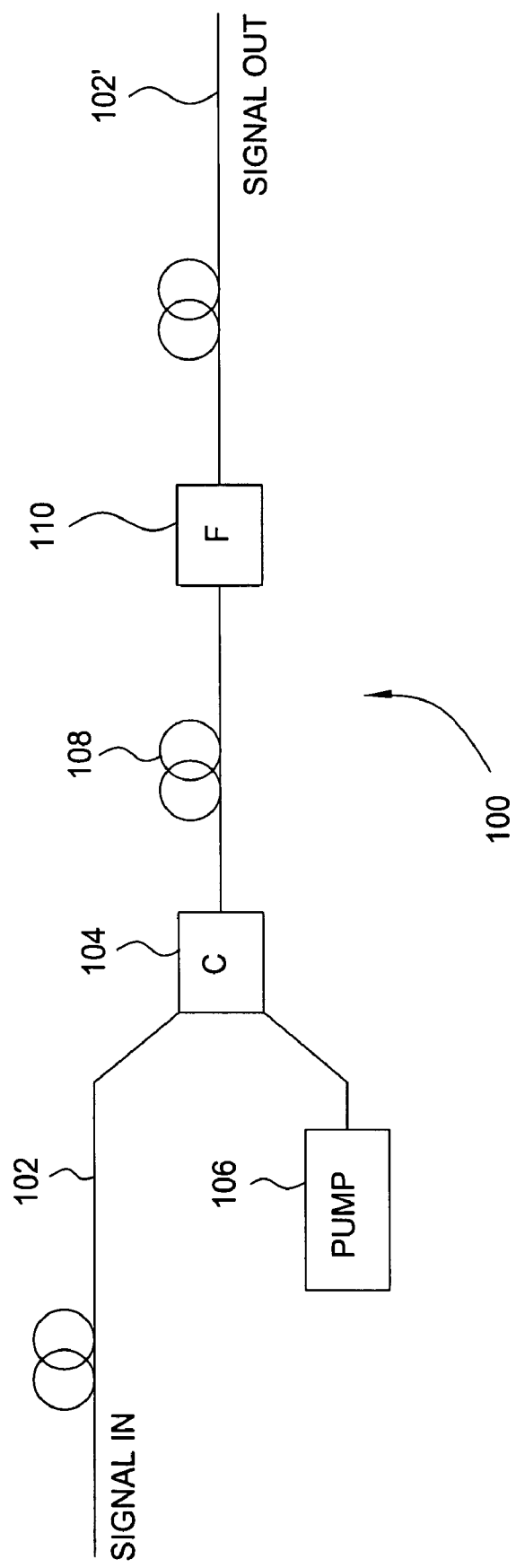
FIG. 1 depicts a representative optical parametric amplifier (OPA) of the prior art as part of a long-haul transmission line in an optical communication system.

FIG. 1 depicts a representative OPA 100 of the prior art that is configured for use in a long-haul transmission line of an optical communication system. OPA 100 is coupled between two sections 102 and 102' of a long-haul optical fiber. OPA 100 has a coupler 104 configured to combine an optical communication signal from section 102 with a pump wave generated by a pump-wave source 106 (e.g., a laser). Depending on the implementation of OPA 100, the pump wave may be a continuous-wave (CW) or pulsed optical signal. The combined signal is directed into a highly non-linear fiber (HNLF) 108, where the optical communication signal is amplified by way of parametric amplification (PA). A filter 110 placed at the end of HNLF 108 separates the amplified optical communication signal (e.g., from the pump wave and an idler signal generated in HNLF 108) for further transmission in the communication system via section 102'.

One attractive feature of OPA 100 is that it can be designed to provide signal amplification at arbitrary wavelengths. In addition, OPA 100 can be configured to conjugate signals and/or change their wavelengths. However, one problem with OPA 100 is that the spectral width of its gain band may be relatively narrow. Also, the spectral shape of that band is typically not flat. One additional problem is that the intensity of the pump wave and therefore the gain in OPA 100 are limited by stimulated Brillouin scattering. These problems impede the use of OPAs in optical communication systems.

The present invention involves an individual or entangled photons, and frequency converting these individual and entangled photons without introducing quantum noise that causes the information of the communication system to be unrecognizable. In one embodiment, a photon at one frequency is frequency converted so that a similar photon is provided at a different frequency. In one embodiment of the present invention, Bragg scattering (BS) is used to convert the photons from one frequency to another without adding extra quantum noise, which becomes critical where the system uses one or very few photons to convey information.

An optical source having a certain signal power generates optical signals. The signal power is the number of signal photons per unit time. Detectors measure the energy of that signal power in a detection time, which is proportional to the number of photons generated in the detection time interval. The detention time interval is generally approximately one nanosecond; however, other time intervals such as picoseconds or longer may be used. In single photon embodiments, the detector detects only one or few photons in the detection time. In classical embodiments, over one hundred thousand photons are detected in the detection time.

Figure 2:
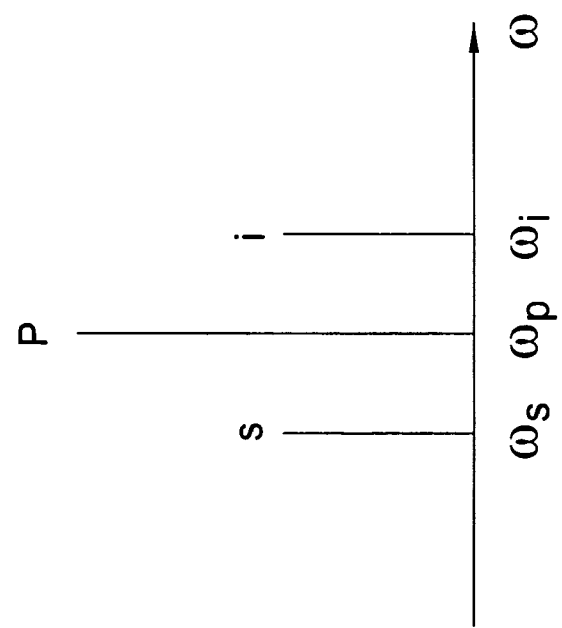
FIG. 2 illustrates the process of parametric amplification in the OPA of FIG. 1.

FIG. 2 illustrates the process of parametric amplification in the OPA of FIG. 1. Signal amplification in OPA 100 is governed by a degenerate four-wave mixing (FWM) process, in which two pump photons (labeled p in FIG. 2) combine to generate one signal photon and one idler photon (labeled s and i, respectively, in FIG. 2) according to the following equation:

$$2\omega_p = \omega_s + \omega_i \quad (1)$$

where $\omega_p$, $\omega_s$, and $\omega_i$ are the frequencies of the pump, signal, and idler photons, respectively. The nonlinear medium, in which the FWM process occurs (e.g., HNLF 108), is characterized by a nonlinearity coefficient ($\gamma$) and a set of dispersion coefficients. Of significance for this analysis are the second-, third-, and fourth-order dispersion coefficients ($\beta_2$, $\beta_3$, and $\beta_4$, respectively). The frequency or wavelength at which $\beta_2=0$ is referred to as the zero-dispersion frequency ($\omega_0$) or wavelength ($\lambda_0$). The regions in which $\beta_2$ is positive and negative are referred to as the normal dispersion region and the anomalous dispersion region, respectively.

Figure 3:
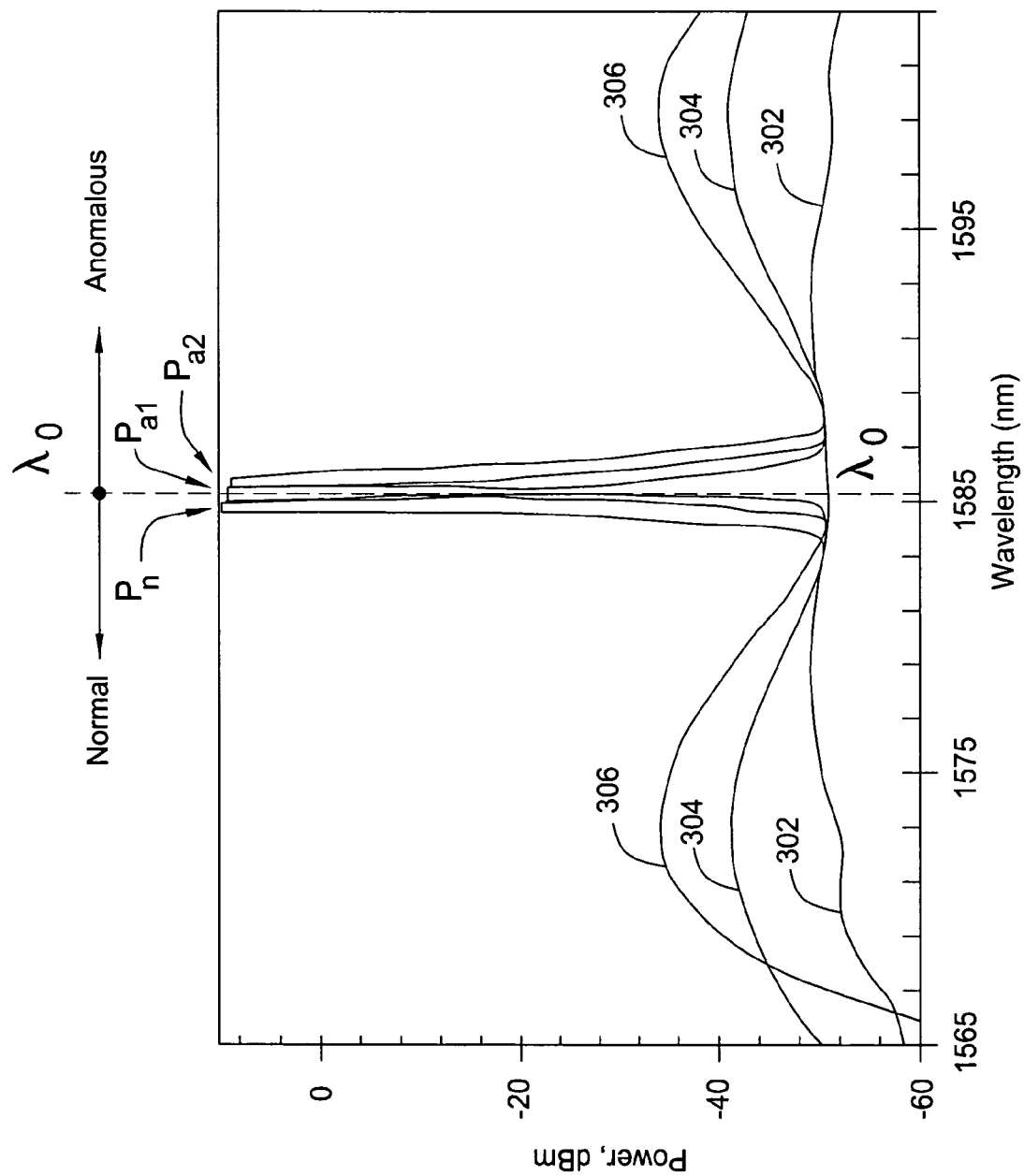
FIG. 3 illustrates the gain bands in the OPA of FIGS. 1 and 2($a$) as a function of the pump wavelength.

FIG. 3 illustrates the gain bands in the OPA of FIGS. 1 and 2(a) as a function of the pump wavelength. For the degenerate FWM process to occur, the wavelength of the pump wave should be in the anomalous dispersion region of HNLF 108. For example, when the wavelength of the pump wave is just inside the normal dispersion region, as for the pump wave labeled $P_n$ in FIG. 3, there is substantially no parametric gain, as can be seen from the corresponding gain curve labeled 302. On the other hand, when the wavelength of the pump wave is in the anomalous dispersion region, as for the pump waves labeled $P_{a1}$ and $P_{a2}$ in FIG. 3, the corresponding parametric gain bands develop, as can be seen from gain curves 304 and 306, respectively. However, the farther the pump wavelength is from the zero-dispersion wavelength, the narrower the corresponding gain bands become, as can be seen from the comparison of curves 304 and 306 in FIG. 3.

It is known in the art that the gain of OPA 100 depends on the power of the pump wave ($P_p$) and the length of HNLF 108. Depending on the relationship between the wave-vector mismatch coefficient ($\kappa$) in HNLF 108, $\gamma$, and $P_p$. OPA 100 can produce either exponential or quadratic gain (each determined by the functional dependence of gain on the length of HNLF 108). For example, if the intensity of the pump wave is chosen such that $\kappa=-\gamma P_p$, then the gain is relatively high and exponential. In contrast, if OPA 100 is designed such that $\kappa=0$, then the gain is quadratic. Other values of $\kappa$ will correspond to a relatively low exponential gain. For reference, the pump power is related to the pump intensity $I_p$ by the equation $P_p = I_p A_e$, where $A_e$ is the effective area of the fiber.

Figure 4:
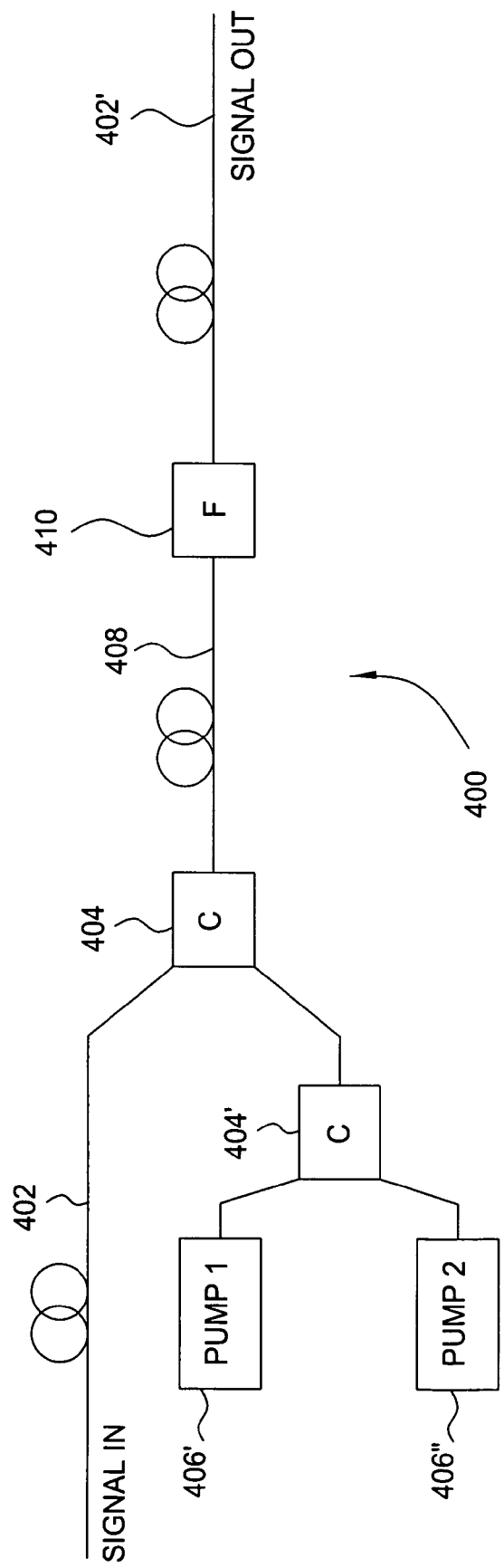
FIG. 4 depicts an OPA according to one embodiment of the present invention.

FIG. 4 depicts an OPA according to one embodiment of the present invention. OPA 400 is similar to OPA 100 of FIG. 1. In particular, in FIG. 4, the components in OPA 400 analogous to those in OPA 100 are illustrated using labels having the same last two digits. However, one difference between OPA 400 and OPA 100 is that two different pump waves generated by two pump-wave sources 406' and 406" are used in OPA 400 to amplify an optical communication signal instead of one pump wave in OPA 100. The two pump waves are combined together using coupler 404' and further combined with the optical communication signal using coupler 404. Alternatively, a three-way coupler may be used to combine the optical communication signal with the two pump waves. Filter 410 extracts the amplified optical communication signal for transmission in the communication system.

The OPA 400 of FIG. 4 and other embodiments of OPAs with two pumps are described in detail in co-pending U.S. patent application Ser. No. 10/232,082 entitled "Parametric Amplification Using Two Pump Waves" filed on Aug. 30, 2002, co-pending U.S. patent application Ser. No. 11/068,555 entitled "Parametric Amplification Using Two Pump Waves" filed on Feb. 28, 2005, co-pending U.S. patent application Ser. No. 11/154,483, entitled "Phase-Sensitive Amplification in a Fiber" filed on Jun. 16, 2005, co-pending U.S. patent application Ser. No. 11/127,244, entitled "Two-Pump Optical Parametric Devices Having Reduced Stimulated Raman Scattering Noise Levels" filed on Jun. 30, 2005, which are all incorporated herein by reference in their entirety.

Figure 5:
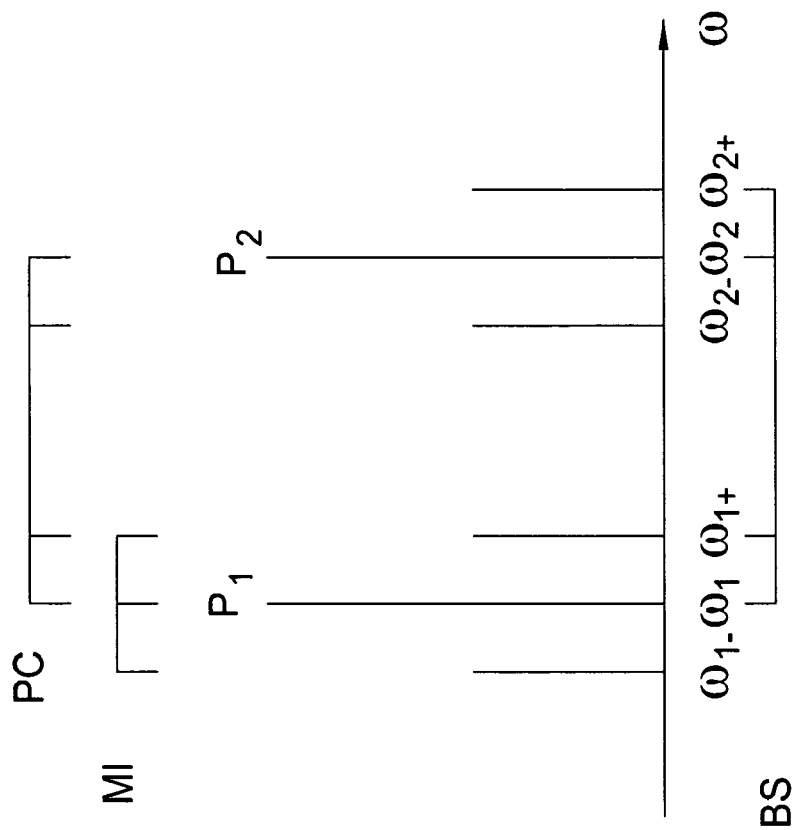
FIG. 5 illustrates a representative frequency structure in the OPA of FIG. 4.

PA driven by two pump waves ($\omega_1$ and $\omega_2$) involves four product waves (sidebands) that are coupled by three distinct FWM processes, as illustrated in FIG. 5. Suppose that the signal frequency $\omega_{1+} = \omega_1 + \omega$, where $\omega$ is the modulation frequency, and let $\gamma$ denote a photon. Then the modulation interaction (MI) in which $2\gamma_1$ becomes $\gamma_{1-}+\gamma_{1+}$ which produces an idler with frequency $\omega_{1-}=\omega_1-\omega$, the phase-conjugation (PC) process in which $\gamma_1+\gamma_2$ becomes $\gamma_{1+}+\gamma_{2-}$ which produces an idler with frequency $\omega_{2-}=\omega_2-\omega$ and the Bragg scattering (BS), or frequency conversion (FC), process in which $\gamma_{1+}+\gamma_2$ becomes $\gamma_1+\gamma_{2+}$ which produces an idler with frequency $\omega_{2+}=\omega_2+\omega$.

In MI and PC, pump photons are destroyed in pairs, whereas sideband (signal and idler) photons are produced in pairs. This behavior enables signal amplification and idler generation. However, it also enables the vacuum fluctuations associated with the signal and idler to be amplified: that is, (excess) noise is produced.

In BS, for each idler photon that is created, a signal photon is destroyed: Power is transferred from the signal to the idler. Because the total sideband power is constant, the vacuum fluctuations are not amplified: no (excess) noise is produced. This distinctive feature of BS is an advantage of the present invention. By choosing the pump and signal frequencies judiciously, one can control whether MI, PC and BS occur separately or simultaneously. In one embodiment, for the MI of pump 1, set $\omega_1$ close to the zero-dispersion frequency $\omega_0$. For PC, set $(\omega_1+\omega_2)/2$ close to $\omega_0$, and for BS, set $(\omega_{1+}+\omega_2)/2$ close to $\omega_0$. Choosing $\omega_1$ and $\omega_2$ is explained in detail in article of C. J. McKinstrie, S. Radic and A. R. Chraplyvy, entitled "Parametric Amplifiers Driven by Two Pump Waves," published in IEEE J. Sel. Top. Quantum Electron. 8, 538-547 and 956 (2002), co-pending U.S. patent application Ser. No. 11/068,555 entitled "Parametric Amplification Using Two Pump Waves" filed on Feb. 28, 2005, co-pending U.S. patent application Ser. No. 11/154,483, entitled "Phase-Sensitive Amplification in a Fiber" filed on Jun. 16, 2005, and co-pending U.S. patent application Ser. No. 11/127,244, entitled "Two-Pump Optical Parametric Devices Having Reduced Stimulated Raman Scattering Noise Levels" filed on Jun. 30, 2005, which are all incorporated herein by reference in their entirety.

FIG. 5 illustrates a representative frequency structure in the OPA of FIG. 4. In the present invention, two intense pump waves having powers $P_1$ and $P_2$ are transmitted into the fiber at frequencies $\omega_1$ and $\omega_2$, respectively. The wave from pump 406' has power $P_1$ at frequency $\omega_1$ and the wave from pump 406" has power $P_2$ at frequency $\omega_2$. At $\omega_+$, a strong input signal (s), having an amount of photons significantly stronger than quantal noise, or a weak quantal input signal (s), having few photons, is transmitted to the coupler 104 such that Bragg scattering process produces the corresponding idler (i) at $\omega_{2+}$. Structurally, the two input lasers and the weak quantal input signal in a HNLF will result in the output of a corresponding quantal state at the converted frequency with no additional quantal noise because of Bragg scattering (BS).

State Translation by Bragg Scattering

FIG. 6(a) through (d) illustrates the eigenpolarizations of BS driven by parallel pumps. In studies of FWM, it is customary to use a classical model for the strong (constant-amplitude) pumps (1 and 2) and a quantal model for the weak (variable-amplitude) sidebands (1+ and 2+). In one embodiment the 1+ sideband includes the input signal (s) and the 2+ sideband is the idler (i). Similar analysis may be done where 2+ is the s and 1+ is the i. Considering the effects of BS on an input that consists of one signal photon and no idler photons one would achieve the relationship of:

$$|1,0\rangle_{in} = \bar{\mu}|1,0\rangle_{out} - \bar{\nu}^*|0,1\rangle_{out} \quad (2)$$

The left hand side of equation 2 represents one input signal photon at 1+ frequency and no input idler photon at 2+ frequency. The right hand side of the equation represents the output after BS, for which there are two possibilities: one signal photon and no idler photon, or no signal photon and one idler photon. The relative probability of each output possibility is determined by the coefficients $\bar{\mu}$ and $\bar{\nu}^*$. These coefficients are determined by characteristics of the OPA, such as pump power, pump frequencies, fiber length, polarizations and powers, and the fiber dispersion and nonlinearity coefficients, length, etc. In one embodiment, the OPA is designed so that $\bar{\mu}=0$ and $|\bar{\nu}^*|=1$. This design enables the complete conversion of s to i at the new $\omega_{2+}$.

The same state transfer property can be shown with two signal photons and no idler photons. Similar to the reasoning for a signal photon and no idler, the input state for two signal photons can be represented by $|1,0;1,0\rangle_{in}$ which results in the following relationship:

$$|1,0;1,0\rangle_{in} = \bar{\mu}\bar{\mu}'|1,0;1,0\rangle_{out} - \bar{\mu}(\bar{\nu}')^*|1,0;0,1\rangle_{out} - \bar{\nu}^* \bar{\mu}'|0,1;1,0\rangle_{out} + \bar{\nu}^*(\bar{\nu}')^*|0,1;0,1\rangle_{out} \quad (3)$$

Hence, if $|\bar{\nu}|$ and $|\bar{\nu}'|=1$ simultaneously while all other coefficients are 0, the output state $|0,1;0,1\rangle$ is a perfect image of the input state $|1,0;1,0\rangle$. Likewise, if the input is the entangled state $|0,0;0',0'\rangle+|1,0;1',0'\rangle$, the output is the entangled state $|0,0;0',0'\rangle+|0,1;0',1'\rangle$ Translation of Individual States In FIG. 6(a), the optical signals are illustrated on a 3-dimensional graph having an x-axis representing wavelength, a y-axis representing a polarization direction that is parallel to a reference and a z-axis representing a polarization direction that is orthogonal to the reference. The two pumps are represented at wavelength 1 and wavelength 2 having the polarization parallel to the reference as shown. In one embodiment, only a single input photon 1+ with only one frequency is the input signal s. As shown in equation 2, the components can be adjusted so that due to BS only a single output photon 2+ is produced at the desired frequency. Thus, the transmitted photon is frequency shifted from 1+ to 2+ with minimal noise. In a further embodiment, the signal frequency 1+ and the second-pump frequency 2 are fixed. One can tune the idler frequency 2+ by varying the first-pump frequency 1.

Translation of Frequency-Entangled States

Figure 6A:
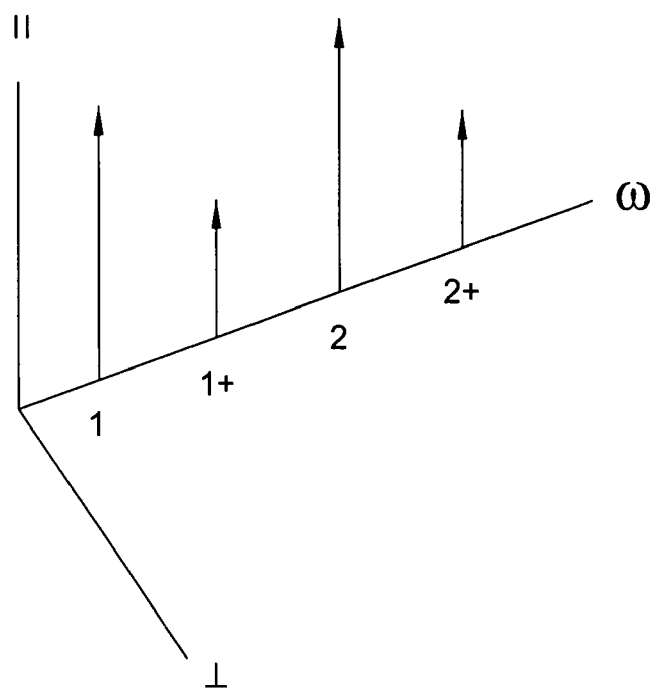
FIG. 6($a$) through ($d$) illustrates the eigenpolarizations of Bragg scattering (BS) driven by parallel pumps.
Figure 6B:
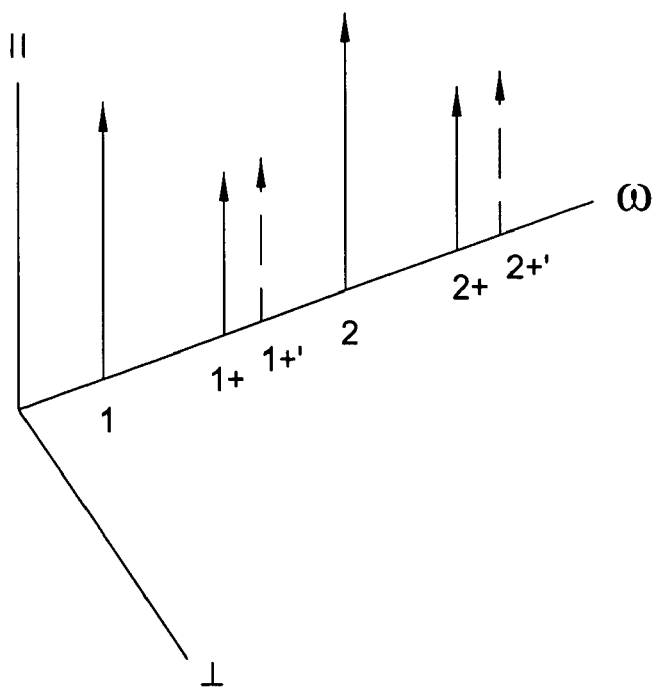

FIG. 6(b) illustrates the process of frequency converting multiple frequency inputs. FIG. 6(b) is a graph similar to the graph of FIG. 6(a). In one embodiment, instead of a single photon at frequency 1+ as in FIG. 6(a), FIG. 6(b) illustrates two photons: one photon s at frequency 1+ and another photon s' at the neighboring frequency 1+'. These two photons will produce two corresponding output idlers i and i' respectively due to BS. One of the output photons is at frequency 2+ and the other is at the neighboring frequency 2+'. This process will work even if there are even more photons. Therefore, BS can transform a wide variety of inputs. Thus, a group of photons with neighboring frequencies can be frequency converted to new neighboring frequencies.

Translation of Polarization-Entangled States

Figure 6C:
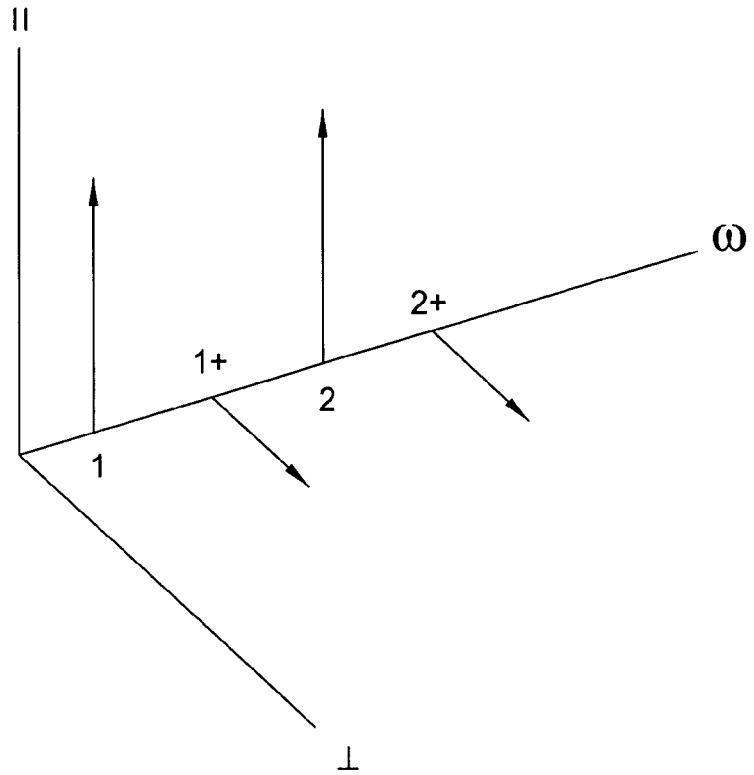

In FIGS. 6(a) and 6(b), the pump lasers and the input signal s are all polarized in the same direction. The signal s can include two or more photons and be polarized in different directions. FIG. 6(c) illustrates an embodiment where an input signal s is being polarized perpendicular to the pump laser signals. The input signal (s) at frequency 1+ is polarized in an orthogonal direction relative the pump lasers as shown. After BS, the resulting output idler (i) will also be orthogonal to the pump lasers at wavelength 2+. Other polarization angles are also possible.

Figure 6D:
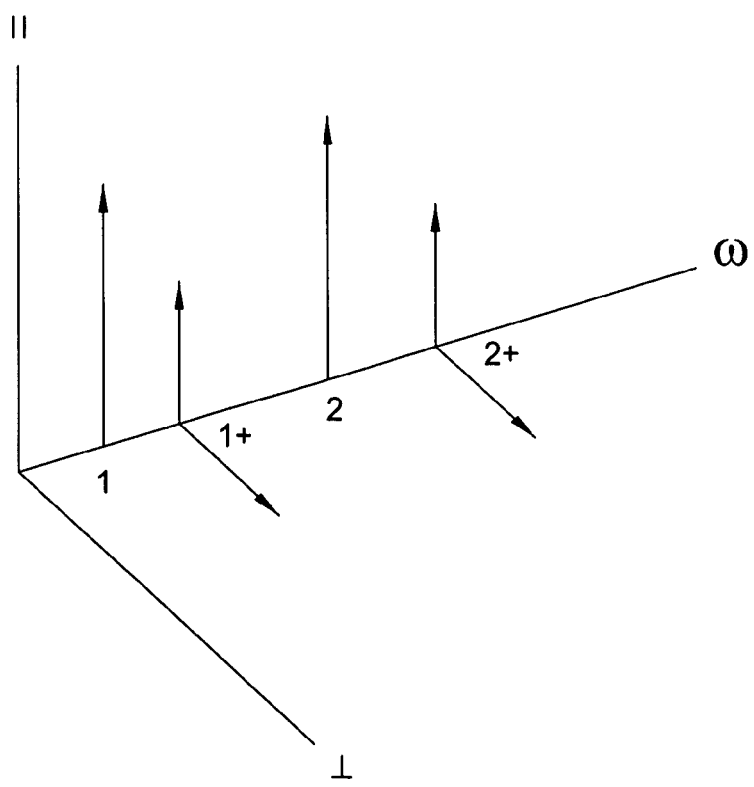

FIG. 6(d) illustrates the polarization entangled state. Illustratively, the signal s can have two photons with two different polarizations with the same frequency. As shown in FIG. 6(d), the input signals at frequency 1+ have two photons having the same frequency but orthogonal polarizations. The resulting output photons after BS both have the converted frequency 2+, and each has the same polarization as the corresponding input photon. As shown by the arrows at frequency 2+, the output idler photons are also orthogonal to each other as shown in FIG. 6(d).

Figure 7:
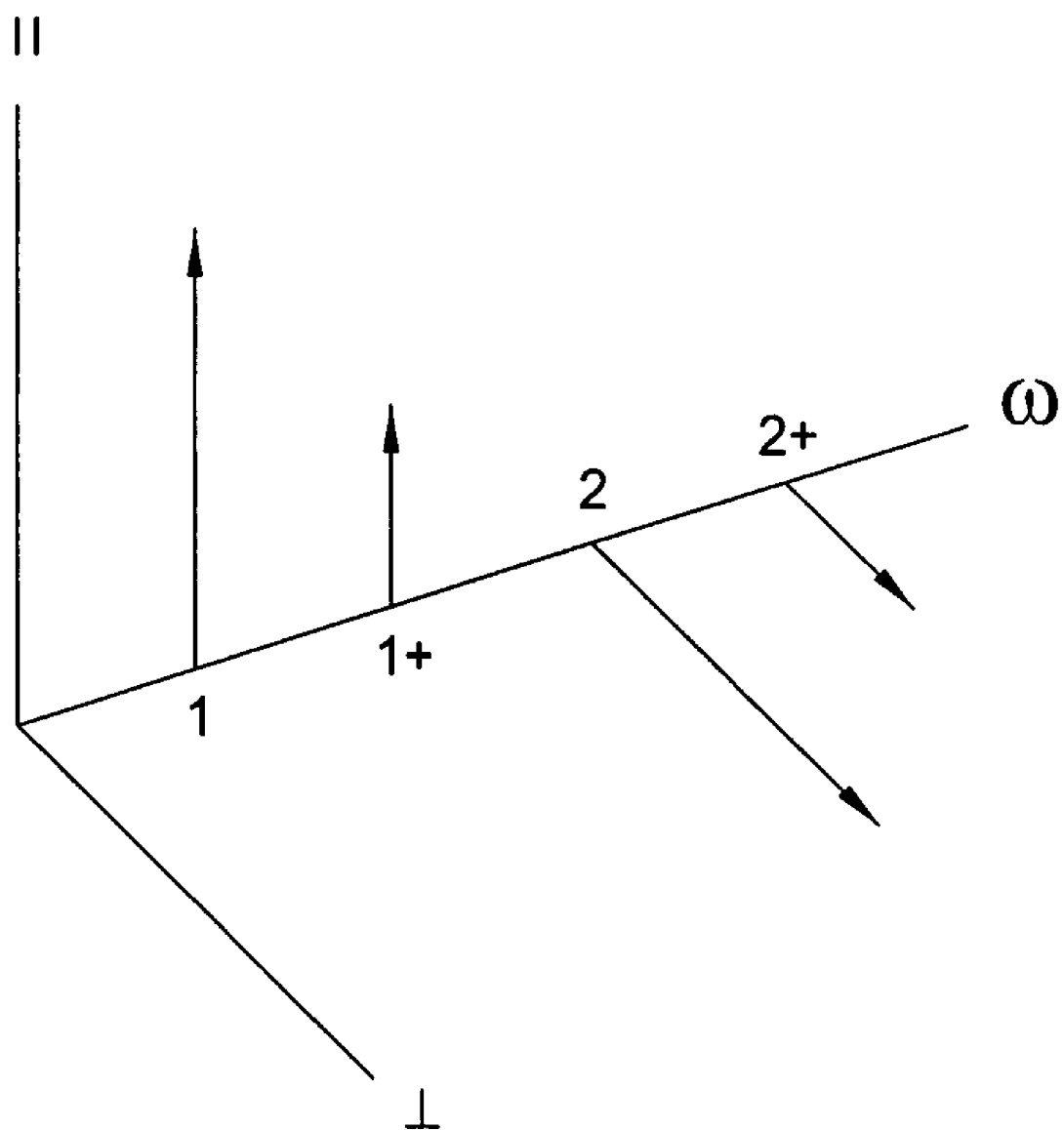
FIG. 7 illustrates the eigenpolarizations of BS driven by perpendicular pumps.

FIG. 7 illustrates the eigenpolarizations of BS driven by perpendicular pumps. The graph of FIG. 7 has four arrows representing the four optical photons similar to FIG. 6(a)-(d). In FIG. 7, the second pump laser at frequency 2 is orthogonal to the first pump laser. When the input signal photon at frequency 1+ enters the fiber, frequency conversion occurs, in which the output photon has frequency 2+ and is polarized perpendicular to the input photon as shown. When the signal photon is perpendicular to pump 1, no idler photon is produced. In other embodiments, multiple photons of different frequencies are used similar to the situations described in FIG. 6(a)-(b).

The eigenpolarizations associated with BS in a HNLF are illustrated in FIGS. 6(a)-(d) and 7. If the pumps are parallel, the BS wavenumber for a parallel signal and idler ($k_\parallel$) is twice the wavenumber for a perpendicular signal and idler ($k\perp$): Maxima of the perpendicular idler transmittance correspond to minima of the parallel transmittance. Alternatively, if the pumps are perpendicular, a signal that is parallel to pump 1 (perpendicular to pump 2) produces an idler, whereas a signal that is perpendicular to pump 1 (parallel to pump 2) produces no idler. These dependences of the idler transmittance on the signal polarization make BS in a HNLF unsuitable for the translation of polarization-entangled states (with different polarizations).

The idler transmittance associated with BS in a twisted (or spun) single-mode fiber (SMF), driven by two co-rotating, circularly-polarized pumps, depends only weakly on the signal polarization. This realization of BS is suitable for the translation of polarization-entangled states.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus, comprising:
    a first optical coupler, for combining first and second optical pump signals to provide a combined pump wave, the first pump wave having a first frequency and the second pump wave having a second frequency different from the first frequency;
    a second optical coupler, for combining the combined pump wave with a relatively weaker input signal to produce a combined input optical signal, the input signal having a frequency associated with a sideband frequency of the combined pump wave; and
    a highly nonlinear fiber, for frequency converting input signal spectral components having a frequency that differs from frequencies of the first and second pump waves, wherein the input signal is frequency converted to an idler signal in the combined input optical signal, the idler signal having a frequency that also differs from the frequencies of the combined pump wave, and wherein the combined input optical signal and the highly nonlinear fiber are adapted for frequency conversion via Bragg scattering without adding quantal noise.

2. The apparatus of claim 1, wherein the input signal comprises one photon per unit of time.

3. The apparatus of claim 1, wherein the input signal comprises a plurality of photons.

4. The apparatus of claim 1, wherein the first end second pump waves have the same polarization.

5. The apparatus of claim 4, wherein two signal photons are frequency converted to two idler photons at two respective new frequencies.

6. The apparatus of claim 5, wherein the two signal photons are separated by a frequency offset.

7. The apparatus of claim 5, wherein the two signal photons are orthogonally polarized to each other.

8. The apparatus of claim 1, wherein the first and second pump waves have orthogonal polarizations relative to each other.

9. The apparatus of claim 8, wherein the input signal is a single photon and is frequency converted to an idler photon at a new frequency and having an orthogonal polarization relative to the input signal photon.

10. The apparatus of claim 8, wherein the input signal includes a plurality of photons being converted to a plurality of idler photons at their respective frequencies and polarizations.

11. A method of operating an optical parametric device as a frequency converter of an optical signal, comprising:
    applying first and second pump waves to a fiber, wherein the first pump wave has a first frequency and the second pump wave has a second frequency different from the first frequency; and
    transmitting a relatively weaker input signal with respect to the pump waves, the input signal having a frequency that differs from the frequencies of the pump waves, wherein the input signal is frequency converted to an idler signal having a frequency that also differs from the frequencies of the pump waves, and the frequency converted idler signal is generated via Bragg scattering without adding quantal noise.

12. The method of claim 11, wherein the input signal comprises one photon per unit time.

13. The method of claim 11, wherein the input signal comprises a plurality of photons.

14. The method of claim 11, wherein the first and second pumps have the same polarization.

15. The method of claim 14, wherein two signal photons are frequency converted to two idler photons at two new frequencies, respectively.

16. The method of claim 15, wherein the two signal photons are separated by a frequency offset.

17. The method of claim 15, wherein the two signal photons are orthogonally polarized to each other.

18. The method of claim 11, wherein the first and second pump waves have orthogonal polarizations.

19. The method of claim 18, wherein the input signal is a single photon and is frequency converted to an idler photon at a new frequency and having an orthogonal polarization relative to the input signal photon.

20. The method of claim 18, wherein the input signal including a plurality of photons being converted to a plurality of idler photons at their respective frequencies and polarizations.

* * * * *